United States Patent
Wang et al.

(10) Patent No.: US 6,552,108 B1
(45) Date of Patent: Apr. 22, 2003

(54) RUBBER BLENDS HAVING IMPROVED STABILITY AND GREEN STRENGTH

(75) Inventors: Hsien Chang Wang, Bellaire, TX (US); Ilan Duvdevani, Houston, TX (US); Connie R. Qian, Houston, TX (US); Pawan Kumar Agarwal, Houston, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 59 days.

(21) Appl. No.: 09/686,215

(22) Filed: Oct. 11, 2000

(51) Int. Cl.⁷ .................................................. C08K 5/29
(52) U.S. Cl. ....................... 524/251; 524/515; 524/528; 524/236
(58) Field of Search ......................................... 524/251

(56) References Cited

U.S. PATENT DOCUMENTS

| | | | |
|---|---|---|---|
| 2,631,984 A | 3/1953 | Crawford et al. ............... 260/5 |
| 2,732,354 A | 1/1956 | Morrissey et al. ............. 260/5 |
| 2,944,578 A | 7/1960 | Baldwin et al. ............ 152/330 |
| 2,964,489 A | 12/1960 | Baldwin et al. ........... 260/41.5 |
| 3,011,996 A | 12/1961 | Kuntz et al. ................ 260/41.5 |
| 3,099,644 A | 7/1963 | Parker et al. ............... 260/85.3 |
| 3,898,253 A | 8/1975 | Buckler et al. .......... 260/42.47 |
| 3,943,664 A | 3/1976 | Broide et al. ................. 51/5 D |
| 3,969,330 A | 7/1976 | Lasis et al. ..................... 526/14 |
| 4,130,354 A | 12/1978 | Coran et al. |
| 4,256,857 A | 3/1981 | Buckler et al. .............. 525/331 |
| 4,454,304 A | * 6/1984 | Tsai ........................... 525/210 |
| 4,921,910 A | 5/1990 | Lunt et al. ...................... 525/74 |
| 5,043,392 A | 8/1991 | Lunt et al. ................... 525/293 |
| 5,073,597 A | 12/1991 | Puydak et al. ............... 525/193 |
| 5,162,445 A | 11/1992 | Powers et al. ........... 525/333.4 |
| 5,386,864 A | 2/1995 | Costemalle et al. ......... 152/510 |
| 5,428,099 A | 6/1995 | Morrar et al. ............... 524/495 |
| 5,597,866 A | 1/1997 | White et al. ................... 525/74 |
| 5,654,379 A | 8/1997 | Powers et al. ............... 525/356 |
| 5,910,543 A | 6/1999 | Patel et al. .................. 525/166 |
| 5,959,049 A | 9/1999 | Powers et al. ............... 526/185 |
| 6,060,563 A | 5/2000 | Peiffer et al. ................ 525/213 |

FOREIGN PATENT DOCUMENTS

| | | |
|---|---|---|
| WO | WO 94/10214 | 5/1994 |
| WO | WO 98/52994 | 11/1998 |

OTHER PUBLICATIONS

"The Chemistry of Phenol–Formaldehyde Resin Vulcanization of EPDM: Part I. Evidence for Methylene Crosslinks," by Martin Van Duin and Aniko Souphanthong, Rubber Chemistry and Technology, vol. 68, pp. 717–727, 1995.

* cited by examiner

*Primary Examiner*—Peter D. Mulcahy
(74) *Attorney, Agent, or Firm*—Kevin M. Faulkner; Leandro Arechederra

(57) ABSTRACT

The present invention relates generally to rubber compositions having improved green strength and thermal stability. These compositions comprise blends of a first rubber component, an isoolefin/para-alkylstyrene copolymer component, and an amine component reacted in situ prior to curing. The present invention further relates to methods for preparing these compositions.

36 Claims, No Drawings

RUBBER BLENDS HAVING IMPROVED STABILITY AND GREEN STRENGTH

FIELD

The present invention relates generally to rubber compositions having improved thermal stability and green strength. These rubber compositions comprise blends of a first rubber component, an isoolefin/para-alkylstyrene copolymer rubber component and an amine.

BACKGROUND

Most conventional rubbers must be crosslinked, i.e., cured or vulcanized, in order to obtain suitably strong, shaped articles. However, crosslinking introduces relatively permanent bonds among the rubber's polymer molecules. Once these bonds are formed, they prevent adequate flowability for subsequent processing or molding. Thus, it is often desirable to process and mold rubber articles prior to curing.

Prior to being crosslinked, however, these rubbers often lack sufficient strength, also known as green strength, for easy handling and processing. Green strength refers to the cohesiveness and dimensional stability under relatively low stress of a rubber compound before it is vulcanized or cured. Green strength is important in such industries as tire manufacturing, where the innerlining and other layers of the tire may be formed in one stage, while curing takes place in a later stage. Green strength is important in allowing the manufacturer to shape and stretch the uncured rubber, while maintaining other favorable properties such as low air permeability.

Ionomerization (i.e., ionomer formation) provides a means for modifying green strength without chemical crosslinking through a cure process. Ionomerization of amines is also known in the art as quaternization, due to the formation of a quaternary amine. Since it is a reversible process, ionomerization provides green strength at lower temperature as well as good processability at higher temperatures. A typical method of ionomerization is the addition of tertiary amines to the rubber compositions, the basic amine functionality interacting with a more acidic functional group on the polymer in order to form stable interactions that increase green strength. U.S. Pat. Nos. 3,898,253 and 4,256,857 generally describe the use of tertiary amines to directly modify halobutyl rubber compositions to improve their green strength. Halobutyl rubber, such as bromobutyl rubber, however, is not very reactive with these amines. Therefore, the mixture must be heated for a substantial period of time in order to obtain sufficient green strength.

The present inventors have found that rubber green strength and/or thermal stability is greatly improved by blending the rubber with an amine and an isoolefin/para-alkylstyrene copolymer. The amine preferentially reacts with the isoolefin/paralkylstyrene to form a quaternary amine ionomer which results in improved green strength. The ionomerization can be performed in situ and with little or no heating. It has also been discovered that these compositions, when cured, exhibit improved thermal and aging stabilization. Alternatively, depending on the type of amine used, stability may be improved without the formation of ionomers.

SUMMARY

The present invention is a composition and a method of forming a composition blend, the composition blend comprising at least two components. A third rubber component may additionally be present in the blend of the invention. The first component is a halogenated isoolefin/para-alkylstyrene copolymer, hereinafter referred to as "component A". Component A is present in the blend from about 95% to about 5% by weight of the blend.

In one embodiment, the isoolefin has between 4 and 7 carbon atoms and said copolymer containing from about 0.5% to about 20% by weight para-alkylstyrene, wherein from about 0.01 mole % to about 60 mole % of the methyl groups present on the benzene ring of the para-alkylstyrene contain a halogen atom. In a preferred embodiment, component A is an EXXPRO™ Elastomer (ExxonMobil Chemical).

The second component is an amine compound represented by the formula $(R^1R^2R^3)N$, wherein $R^1$ is either hydrogen or a $C_4$ to $C_{30}$ hydrocarbyl group, $R^2$ is either hydrogen or a $C_1$ to $C_{30}$ hydrocarbyl group; and $R^3$ is either hydrogen or a $C_1$ to $C_{30}$ hydrocarbyl group provided that at least one of $R^1$, $R^2$ and $R^3$ is not hydrogen. The amine is present from about 0.1 to about 5% by weight of the blend. In another embodiment, the blend contains the amine from about 0.1 mole % to about 60 mole % relative to the mole % of halogen atom present in the blend. Further, the amine compound is selected from the group consisting of N,N-dimethyl hexadecylamine, N,N-dimethyl hexylamine, N,N-dimethyl dodecylamine, N,N-dimethyl octadecylamine and N,N-diethyl decylamine, N,N-dimethylbenzylamine, N,N-methyl propyl hexadecylamine, and morpholine.

When present, a third component is a rubber component (hereinafter referred to as a "rubber" or "rubber component") comprising from about 5% to about 95% by weight of the blend. The rubber is selected from the group consisting of butyl rubber, halogenated butyl rubber, isobutylene homopolymers, neoprene, nitrile rubbers, ethylene/propylene/diene terpolymers, ethylene/propylene copolymers, an isoolefin/para-alkylstyrene, a halogenated isoolefin/para-alkylstyrene, and natural rubbers.

In another embodiment, the rubber component is a halogenated butyl rubber, wherein the halogenated butyl rubber contains from about 85% to about 99.5% by weight repeat units derived from isobutylene, from about 0.1 to about 15% by weight repeat units derived from conjugated diene and from about 0.1% to about 15% by weight halogen. In a preferred embodiment, the conjugated diene is derived from isoprene. In another preferred embodiment, the rubber component is a halogenated isoolefin/para-alkylstyrene.

DETAILED DESCRIPTION

The blends of the present invention comprise at least two components: a first halogenated isobutylene/paralkylstyrene component and an amine component. In another embodiment, another rubber may be present as a third component. The invention also includes a method of forming the blend with the amine and other components. The blend is initially uncured (or unvulcanized) when combined, but may also be cured to form a cured blend.

The rubber component is the constituent for which improved green strength is desired. The term "rubber" or "rubber component" as used herein may include, but is not in any way limited to, the following polymers: butyl rubber, halogenated butyl rubber, isobutylene homopolymer, neoprene, nitrile rubbers, ethylene/propylene/diene terpolymers, ethylene/propylene copolymers, styrene butadiene rubbers, polybutadiene, polyisoprene, isoolefin/paralkylstyrene copolymer, halogenated isoolefin/paralkylstyrene copolymer, natural rubber, and mixtures thereof.

As used herein the term "butyl rubber" is defined to mean a polymer predominately comprised of repeat units of isobutylene but including a few repeat units of a conjugated diene. Preferably from about 85% to about 99.5% by weight of the butyl rubber are repeat units derived from the polymerization of isobutylene, while from about 0.1% to about 15% by weight of the repeat units are derived from a conjugated diene having from 4 to 8 carbon atoms such as butadiene, isoprene, hexadiene, etc., with isoprene being preferred.

"Halogenated butyl rubber" is defined to mean butyl rubber that contains at least 0.05% by weight halogen such as chlorine or bromine, preferably bromine.

Preferred halogenated butyl rubbers are those that contain from about 0.1% to about 15% by weight halogen, more preferably from about 0.5% to about to about 10.0% by weight halogen based on the total weight of the halogenated polymer.

Numerous patents disclose halogenated butyl rubber containing various amounts of chemically bound halogen, see for example, U.S. Pat. Nos. 2,631,984; 2,732,354; 3,099,644; 2,732,354; 2,944,578; 3,943,664; 2,964,489; and 4,130,534 (each fully incorporated herein by reference).

As used herein "nitrile rubbers" are copolymers of acrylonitrile with a conjugated diene having from 4 to 8 carbon atoms, with butadiene being preferred.

As used herein, "ethylene/propylene copolymers" are defined to mean those elastomeric or thermoplastic curable copolymers comprising ethylene and propylene. The preferred ethylene/propylene copolymer is one in which the ethylene component is between about 20 and 90% by weight of the copolymer.

As used herein, "ethylene/propylene/diene terpolymers" are defined as those elastomeric or thermoplastic curable terpolymers comprising ethylene, propylene and diene units. Preferred diene units are 5-ethylidene norbornene, 5-methylidene norbornene, dicyclopentadiene, 1,4-hexadiene and 5-vinyl norbornene.

As used herein "isoolefin/paralkylstyrene copolymers" are those elastomeric or thermoplastic curable copolymers comprising isoolefin units, preferably isobutylene units, and a comonomer such as alkylstyrene, preferably para-alkylstyrene. Preferably, the isobutylene copolymers are characterized in that from about 85% to about 99.5% by weight of the polymer is derived from isobutylene. More preferably, the isobutylene copolymers are characterized in that from about 85% by weight to about 98% by weight, or more preferably from about 90% to 98% by weight, of the polymer is derived from isobutylene.

From about 0.5% to about 20% by weight, preferably from about 2% to about 15% by weight, or more preferably from about 2% to about 10% by weight, of the polymer is repeat units derived from alkylstyrene. Preferably, the alkyl group has from 1 to 10 carbon atoms, such as methylstyrene, and most preferably is para-methylstyrene. These polymers may also be halogenated so that they contain from abut 0.1% to about 5% by weight halogen, preferably from about 0.5% to about 2.0% by weight halogen based on the total weight of the halogenated polymer. Preferably the halogen is bromine. The preferred bromine species is benzyl bromine.

Stated another way, preferred halogenated isoolefin/para-alkylstyrene copolymers are those wherein from about 0.1 mole % to about 60 mole %, more preferably from about 0.5 mole % to about 30 mole %, of the methyl groups present on the benzene ring of the para-alkylstyrene contain a halogen atom. Such polymers are described is U.S. Pat. No. 5,162,445 which is fully incorporated herein by reference.

Any amine may be used as the amine component as long as it is sufficiently compatible with the rubber component, and component A, and as long as permanent crosslinking is avoided. When improved green strength is desired, preferably, the amine component is one capable of ionomerizing the copolymer component. These amines may be represented by the formula $(R^1R^2R^3)N$ wherein $R^1$ is either hydrogen or a $C_4$ to $C_{30}$ hydrocarbyl group, $R^2$ is either hydrogen or a $C_1$ to $C_{30}$ hydrocarbyl group, and $R^3$ is either hydrogen or a $C_1$ to $C_{30}$, preferably a $C_1$ to $C_8$, hydrocarbyl group, provided that at least one of $R^1$, $R^2$ and $R^3$ is not hydrogen. Preferably, $R^3$ is a methyl or ethyl group and one of $R^1$ or $R^2$ is a $C_6$ to $C_{20}$ hydrocarbyl group and the other is a methyl or ethyl group. The hydrocarbyl groups, independently, may be saturated, unsaturated, cyclic or aromatic.

Thermal and age stability may be obtained even if the amine selected does not form ionomers with the copolymer component. Such amines tend to be more hindered and may be represented by the formula $(R^1R^2R^3)N$ wherein $R^1$ and $R^2$ are independently a $C_4$ to $C_{30}$ hydrocarbyl group and $R^3$ is either hydrogen or a $C_1$ to $C_{30}$ hydrocarbyl group.

Examples of suitable amine components include, but are not limited to: N,N-dimethyl hexadecylamine, N,N-dimethyl hexylamine, N,N-dimethyl dodecylamine, N,N-dimethyl octadecylamine, N,N-diethyl decylamine, N,N-dimethylbenzylamine, N,N-methyl propyl hexadecylamine, and morpholine.

The component A, amine, and when present, the rubber component, are combined in amounts effective to produce the desired improvement in green strength and/or stability. The precise concentrations of each component will thus depend on the specific components used. The relative amounts of rubber and amine will generally dictate the degree of ionomerization since the amine will preferentially react with the rubber. When a halogenated rubber component is used, for example, the preferred amine level is from about 0.05 to about 2 mole equivalents of amine per rubber or component A halogen, more preferably from about 0.1 to about 1 mole equivalent of amine per rubber or component A halogen.

The present invention is particularly effective when blends of component A and another rubber component are employed. The relative amounts of component A, amine, and when present, the rubber component, will depend on the particular rubber component used. Preferably, only so much amine and component A is used as is needed to improve green strength and/or stability to the desired degree. For example, the weight percent of the rubber component may vary from as little as about 5% to up to about 95% by weight of the blend, more preferably from about 10% to about 90% by weight of the blend, even more preferably from about 20% to about 80% by weight of the blend.

The method used to combine the at least two components is not critical as long as there is adequate dispersion of the amine and other components within the rubber. The ionomerization occurs in situ. Thus, any mixing device may be used. Preferably mixing is facilitated by heating the mixture from 50° C. up to 200° C., and preferably from 50° C. up to 150° C. in an internal mixer or rubber mill. Notably, it is not necessary to heat the mixture and/or mix for extended periods of time after mixing is achieved in order to obtain adequate ionomerization. Once the components are blended, additional mixing or heating time for reaction should not be necessary.

The mixing order is not critical. For convenience, the at least two components may be blended at one time. Alternatively, the rubber component and amine (and other components when present) may be blended first, followed by addition of component A. For some applications, it may be desirable to pre-blend the amine and rubber and then add the component A, or pre-blend the component A and rubber followed by the amine.

Various additives may be used in suitable amounts. For example, various reinforcing agents or fillers such as carbon black, clay, silica, talc, and the like may be combined with the blend at any point during production. Various colorants may be added such as titanium dioxide, carbon black, etc. Other additives include antioxidants, stabilizers, processing oils, lubricants, anti-static agents, waxes, flame retardants and plasticizers.

After component A, amine, and when present, the rubber, are combined, the composition having improved green strength may be used directly in molded, extruded or shaped articles. It may be necessary to heat the blend in order to obtain the necessary viscosity for molding.

The blended compositions may also be cured using conventional curing or vulcanizing agents. Examples include sulfur and sulfur vulcanizing agents; various organic peroxides such as benzoyl peroxide, dicumyl peroxide, 2,5 dimethyl-2,5 di(tertbutylperoxy)hexane, and 2,2'-bis(tertbutylperoxy)diisopropyl benzene; hydrosilation curing agents; metal oxides such as zinc oxide or magnesium oxide, or organic zinc salts such as zinc stearate; diamines; co-curing agents such as various maleimides; and the like; all as set forth in U.S. Pat. No. 5,073,597, hereby fully incorporated by reference. Moreover, various phenolic resins known to the art and to the literature can be utilized, as well as various phenol-formaldehyde resins as set forth in "The Chemistry of Phenol-Formaldehyde Resin Vulcanization of EPDM: Part I. Evidence for Methylene Crosslinks," by Martin Van Duin and Aniko Souphanthong, Rubber Chemistry and Technology, vol. 68, pp 717–727, 1995, hereby fully incorporated by reference.

The amount of the curing agent will generally vary depending upon the type utilized and especially the desired degree of cure, as is well recognized in the art. For example, the amount of sulfur is generally from about 1 to 5, and preferably from about 2 to about 3 parts by weight per 100 parts by weight of the blend. The amount of the peroxide curing agent is generally from about 0.1 to about 2.0 parts by weight, the amount of the phenolic curing resin is generally from about 2 to about 10 parts by weight, and the amount of the hindered amine is from about 0.1 to about 2 parts by weight, all based upon 100 parts by weight of the blend.

Whenever a halogenated butyl rubber or any halogenated rubber is utilized, a small amount of an alkaline earth oxide compound such as magnesium oxide is utilized in an amount of about 3 parts by weight or less, and desirably about 2 parts by weight or less for every 100 parts by weight of the halogenated rubber. The alkaline earth oxide is added to act as a scavenger of hydrogen halides.

Conventional catalysts (accelerators) can also be utilized such as those known to the art and to the literature. For example, suitable amounts of various Friedel-Crafts catalysts can be utilized such as stannous chloride, salicylic acid, para-toluene sulfonic acid, zinc chloride, and the like.

The amount of the curative and accelerators are such that a degree of cure, that is, at least 90%, desirably at least 95 or 96%, preferably at least 97% or 98% of the curable rubber is nonextractable in a suitable solvent for the particular rubber at 23° C. Suitable solvents include xylene, cyclohexane, acetone, hexane, toluene, and the like.

It has surprisingly been found that, once the blended compositions are cured, they demonstrate improved thermal and aging stabilization when the composition of the present invention is cured. Thus, not only is green strength improved, the overall characteristics of the cured rubber product are improved.

The blended compositions of this invention have a wide variety of ultimate uses. For example, tubings, hoses, gaskets, diaphragms, tires, innerliners, films, bumpers, membranes, adhesives, innertubes and other items where rubbers or rubber-copolymer blends are employed.

The following examples are presented to illustrate the foregoing discussion. Although the examples may be directed to certain embodiments of the present invention, they are not to be viewed as limiting the invention in any specific respect.

EXAMPLE 1

A series of compounds shown in Table 1 were prepared according to the following details. Two elastomers from ExxonMobil Chemical were used: Bromobutyl 2222 specified to contain 2 weight % of bromine and having a Mooney viscosity of 32 at 125° C., and EXXPRO™ 89-1 Elastomer (ExxonMobil Chemical), a brominated p-methylstyrene-co-isobutylene copolymer having 0.75 mole % bromine, or about 1.2 weight % bromine on a 5 weight % p-methylstyrene (PMS) containing polymer having a Mooney viscosity of 35 at 125° C.

Three Master Batch (MB) compounds were mixed in an internal lab mixer (a BR Banbury mixer by Farrel Co.) incorporating all of the ingredients shown in Table 1, except for the amine ingredient. MB1 (compounds 1A through 1D) were based on the bromobutyl elastomer. MB2 (compounds 2A and 2B), and MB3 (compounds 3A and 3B) were based on a mixture of the bromobutyl and EXXPRO™ Elastomers. The amine used was a tertiary amine, N,N-dimethyl hexadecylamine, Armeen DM16D (Akzo Nobel Co.). The amine was added at the levels shown in Table 1 on a two-roll rubber mill.

The MB mixes had a total batch weight of 1500 g each following the formulations in Table 1 (excluding amine). The mixer was operated at 100 RPM with 60° C. water circulated through the mixer walls. The elastomers were added to the mixer first with all other ingredients added 30 seconds after introduction of the elastomers into the mixer. The mixed compounds were removed from the mixer when the compound temperature reached about 150° C.

The MB ingredients shown in Table 1 other than the ones described above were: a paraffinic oil, Drakeol 35 mineral oil (PenRe Co.); carbon black designated as N 660 black; stearic acid (Witco Co.); Magnesium oxide, Maglite K (C.P. Hall Co.).

The amine described above was added to 350 g portions of the three MB compounds on a lab rubber mill of 6×13 inch. (or about 15.2×33 cm) roll size (KBS Corp.). The mill had cooling water at about 27° C. circulated through the rolls. The mill mix procedure started with blending the MB compounds on the mill following gradual addition of the liquid amine, until it was evenly dispersed by cutting and rolling a number of times.

The compounds of Table 1 were then calendered at a low speed between 2 calender rolls kept at about 85° C. The calendering process started by warming up the compounds on the calender to the point the compound stayed smoothly on one roll. Following this, the compound was left on the turning roll for about 2 minutes to obtain a homogeneous temperature, after which the compound was removed as a smooth sheet of about 3 mm thick.

The sheets were pressed into pads of about 0.2×15×15 cm between Mylar polyester film in a 100° C. mold. Samples of 0.5×3 inch (about 1.25×7.6 cm) were cut for testing.

Green strength was tested using two different Instron testers, one that was equipped with an environmental chamber heated to 40° C. The samples were clamped at 1 inch (2.54 cm) distance between the tester clamps. The test was conducted by moving the clamps apart at a speed of 5 in/min (about 12.7 cm/min) to a 100% extension, a total stretching distance of 1inch (2.54 cm). The "engineering stress" (force divided by original cross sectional area) at 100% extension was defined as the "green strength", and is shown in Table 1 for 2 testing temperatures, ambient (about 25° C.) and 40° C.

A different portion of 250 g each of the calendered samples of Table 1 were additionally mixed with a typical tire innerliner cure package on the lab mill described above. The mill rolls were kept cool by circulating 24° C. water through them. The cure ingredients consisted of 3 phr zinc oxide (Kadox 930C from Zinc Corporation of America), 0.5 phr sulfur from R.E. Carroll, Inc. and 1.5 phr MBTS (Altax from R.T. Vanderbilt Company, Inc.). The term "phr" (parts per hundred rubber) designates the proportion of the ingredient level per 100 g of the total elastomer or elastomer blend from Table 1. The compounds were then cured in a hot press at 160° C. for about 18 to 27 minutes at a time equal to 90% cure time (t90) plus 2 minutes as determined by a curometer test using an ODR 2000E (Alpha Instruments), operating at 160° C. at 3° arc and a standard oscillation rate of 100 cpm, for 60 min.

All the test results are shown in Table 1. Samples 1A through 1D show a progressive increase in green strength with amine levels from zero to 1.5 phr. This increase in green strength indicates an ionic association between the polymer molecules with addition of the tertiary amine.

For compounds 2B and 3B, green strength at an amine level of 0.5 phr was similar to the green strength of sample 1D at 1.5 phr level of the amine, with sample 3B having a somewhat higher green strength than sample 2B. This indicates that in the presence of EXXPRO™ 89-1 Elastomer, the ionic association was much stronger. At 1.0 and 1.5 phr of amine, MB compounds 2 and 3 exhibited very high viscosities such that calendering could not produce smooth sheets.

Cured compound results are shown in terms of hardness in Shore A units. It is normally experienced that hardness goes up with heat aging in halobutyl compounds as is the case with compounds 1A, 2A and 3A. However, the addition of tertiary amine reduced the hardening with aging under heat. It can be seen in Table 1 that about 0.5 to 1.0 phr of tertiary amine is enough to virtually stop heat aging after 48 hours of exposure at 125° C.

This example demonstrates increased green strength with the addition of tertiary amine to bromobutyl compounds and particularly when brominated p-methylstyrene-co-isobutylene polymer (EXXPRO™ Elastomers) present in the compound. The example also demonstrates improved heat aging stability with the addition of a tertiary amine to bromobutyl and to mixtures of bromobutyl and EXXPRO™ Elastomer.

EXAMPLE 2

A series of compounds shown in Table 2 was mixed in an internal lab mixer following the procedure described in Example 1. Three elastomers were used in this series, the two described in Example 1 (bromobutyl 2222 and EXXPRO™ 89-1 Elastomer) and a third brominated p-methylstyrene-co-isobutylene elastomer, EXXPRO™ 3035 Elastomer (ExxonMobil Chemical). The third polymer had a backbone containing 5% by weight PMS before bromination, 0.48 mole % of bromine, and a Mooney viscosity of 45 at 125° C. In this series, the tertiary amine was introduced into the internal mixer close to the end of the mixing cycle. The cure package described in Example 1 was also used in this example by incorporating it on a 2-roll rubber mill as described in Example 1.

In this series, pairs of compounds are compared with and without added tertiary amine. Compounds 4A and 4B compare bromobutyl based compounds, 5A and 5B compare blends of bromobutyl with 2.0 phr of EXXPRO™ 89-1 Elastomer, and 6A and 6B compare bromobutyl blends with 2.0 phr of EXXPRO™ 3035 Elastomer. For the straight bromobutyl 1 phr amine was added in compound 4B and for the mixed elastomer compounds a lower level of the same amine, 0.5 phr, was added in compounds 5B and 6B.

The green strength of each compound of Example 2 was tested as in Example 1, but the samples were extended to break at 40° C. and an extension rate of 10 in/min (25.4 cm/min). This example demonstrates an increase of 100% modulus (a measure of green strength) with the addition of amine. The 6A and 6B pair, where EXXPRO™ 3035 Elastomer was used, show the highest increase in 100% modulus and elongation to break. In this example, as in Example 1, addition of amine reduces heat-aging affects. It is shown in Table 2 that all compounds containing the tertiary amine show lesser changes with heat aging for cured modulus, elongation and hardness.

The example also shows that amine addition does not affect the physical properties of the unaged compounds. Further, the improved heat aging stability by adding the tertiary amine is shown for bromobutyl compounds with or without the presence of EXXPRO™ Elastomer polymers in the blend.

EXAMPLE 3

A series of tire innerliner model compounds shown in Table 3 was mixed in an internal lab mixer following the procedure of Example 2, where all ingredients were added to the internal mixer. The series is based on a blend of 70/30 brominated-star-branched butyl (BrSBB 6222, ExxonMobil Chemical) with a brominated p-methylstyrene-co-isobutylene copolymer (EXXPRO™ 90-3 Elastomer, ExxonMobil Chemical). The BrSBB 6222 contained a specified amount of 2.4% by weight bromine and had a Mooney viscosity of about 32 at 125° C. The EXXPRO™ Elastomer, 90-3, had a backbone containing 5 weight % of PMS before bromination and had 0.52 mole % bromine and a Mooney viscosity of 55 at 125° C. In the compounds of this series, a homogenizing agent, Struktol 40 MS (Struktol Company) and a tackifying resin, SP-1068 (Schenectady International Inc.) were also used. The tertiary amine of this series was trihexadecylamine from the same source as the amine of Examples 1 and 2.

The compounds of this series contain an increasing amount of amine from zero in compound 7 to 1.08 phr in compound 10. Green tensile strength was tested for the compounds of Table 3 following the procedure used in Example 2, at 40° C. The 100% modulus and elongation to break of all the compounds in Table 3 are not significantly different from each other. This example demonstrates that a tertiary amine which is highly hindered such as trihexadecyl amine, having 3 $C_{16}$ branches attached to the nitrogen, is not effective in creating strong associations between the polymer chains as the amine of Examples 1 and 2.

In all, these examples show the utility of the present invention. By addition of a tertiary amine to the rubber and copolymer components the green strength is increased, while also improving the thermal stability of the cured product. The data in Tables 1 and 2 shown that, in the case of Bromobutyl 2222 alone, the presence of amine improves thermal stability. When a halogenated isoolefin/paralkylstyrene such as an EXXPRO™ Elastomer is present with the Bromobutyl 2222, and amine is then added, the green strength and thermal stability is improved. The amounts of the various components can be modified to suit different manufacturing needs, as well as the choice of the amine itself.

TABLE 1

| Compound | 1A | 1B | 1C | 1D | 2A | 2B | 3A | 3B |
|---|---|---|---|---|---|---|---|---|
| Bromobutyl 2222 | 100 | 100 | 100 | 100 | 70 | 70 | 50 | 50 |
| EXXPRO ™ 89-1 Elastomer | 0 | 0 | 0 | 0 | 30 | 30 | 50 | 50 |
| Paraffinic Oil | 10 | 10 | 10 | 10 | 10 | 10 | 10 | 10 |
| N 660 Black | 50 | 50 | 50 | 50 | 50 | 50 | 50 | 50 |
| Stearic Acid | 2 | 2 | 2 | 2 | 2 | 2 | 2 | 2 |
| MgO | 0.15 | 0.15 | 0.15 | 0.15 | 0.15 | 0.15 | 0.15 | 0.15 |
| N,N-dimethyl hexadecylamine | 0.0 | 0.5 | 1.0 | 1.5 | 0.0 | 0.5 | 0.0 | 0.5 |
| Green Strength - 100% Modulus | | | | | | | | |
| 25° C., MPa | 0.241 | 0.317 | 0.358 | 0.388 | 0.236 | 0.335 | 0.241 | 0.381 |
| 40° C., MPa | 0.182 | 0.220 | 0.255 | 0.305 | 0.176 | 0.243 | 0.178 | 0.270 |
| Cured Hardness - Shore A | | | | | | | | |
| Unaged | 55.3 | 52.5 | 52.7 | 53.1 | 54.1 | 52.3 | 53.5 | 51.7 |
| Aged 48 h at 125° C. | 59.5 | 53.7 | 53.1 | 51.3 | 60.1 | 53.1 | 58.3 | 51.9 |

TABLE 2

| Compound | 4A | 4B | 5A | 5B | 6A | 6B |
|---|---|---|---|---|---|---|
| Bromobutyl 2222 | 100 | 100 | 80 | 80 | 80 | 80 |
| EXXPRO ™ 89-1 Elastomer | 0 | 0 | 20 | 20 | 0 | 0 |
| EXXPRO ™ 3035 Elastomer | 0 | 0 | 0 | 0 | 20 | 20 |
| Paraffinic Oil | 10 | 10 | 10 | 10 | 10 | 10 |
| N 660 Black | 50 | 50 | 50 | 50 | 50 | 50 |
| Stearic Acid | 2 | 2 | 2 | 2 | 2 | 2 |
| MgO | 0.15 | 0.15 | 0.15 | 0.15 | 0.15 | 0.15 |
| N,N-dimethyl hexadecylamine | 0 | 1 | 0 | 0.5 | 0 | 0.5 |
| 40° C. Green Tensile Strength | | | | | | |
| 100% Modulus, MPa | 0.188 | 0.212 | 0.208 | 0.283 | 0.211 | 0.292 |
| Elongation % | 317 | 341 | 351 | 575 | 326 | 643 |
| Cured Tensile Strength, Unaged, Test Temperature 25° C. | | | | | | |
| 100% Modulus, MPa | 1.20 | 1.21 | 1.24 | 1.38 | 1.27 | 1.23 |
| % Strain at break | 688 | 685 | 672 | 699 | 723 | 748 |
| Cured Tensile Strength, Aged 48 h at 120° C., Test Temperature 25° C. | | | | | | |
| 100% Modulus, MPa | 1.94 | 1.51 | 1.76 | 1.68 | 1.83 | 1.49 |
| % Strain at break | 564 | 644 | 518 | 640 | 596 | 698 |
| Cured Tensile Strength, Aged 48 h at 140° C., Test Temperature 25° C. | | | | | | |
| 100% Modulus, MPa | 1.79 | 1.48 | 1.99 | 1.52 | 1.88 | 1.48 |
| % Strain at break | 562 | 640 | 512 | 634 | 586 | 697 |
| Shore A Hardness (Cured) | | | | | | |
| Unaged | 47.1 | 51.1 | 54.7 | 53.7 | 54.3 | 51.9 |
| Aged (48 h at 120° C.) | 58.1 | 53.1 | 58.1 | 55.5 | 58.2 | 54.1 |
| Aged (48 h at 140° C.) | 60.7 | 54.5 | 59.7 | 55.3 | 57.1 | 54.1 |

TABLE 3

| Compound | 7 | 8 | 9 | 10 |
|---|---|---|---|---|
| BrSBB 6222 | 70 | 70 | 70 | 70 |
| EXXPRO ™ 90-3 Elastomer | 30 | 30 | 30 | 30 |
| Paraffinic Oil | 10 | 10 | 10 | 10 |
| Struktol 40 MS | 5 | 5 | 5 | 5 |
| N 660 Black | 60 | 60 | 60 | 60 |
| SP-1068 Resin | 4 | 4 | 4 | 4 |
| Stearic Acid | 2 | 2 | 2 | 2 |
| MgO | 0.15 | 0.15 | 0.15 | 0.15 |
| Trihexadecylamine | 0 | 0.36 | 0.72 | 1.08 |
| Green Tensile Strength, 40° C. | | | | |
| 100% Modulus, MPa | 0.239 | 0.237 | 0.235 | 0.256 |
| % Elongation | 376 | 374 | 426 | 365 |

We claim:

1. A blend composition comprising:
   from about 5% to about 95% by weight of a rubber component;
   an amine compound represented by the formula $(R^1R^2R^3)N$, wherein $R^1$ is either hydrogen or a $C_4$ to $C_{30}$ hydrocarbyl group, $R^2$ is either hydrogen or a $C_1$ to $C_{30}$ hydrocarbyl group; and $R^3$ is either hydrogen or a $C_1$ to $C_{30}$ hydrocarbyl group, provided that at least one of $R^1$, $R^2$ and $R^3$ is not hydrogen; and
   from about 95% to about 5% by weight of a component A, wherein said component A consists essentially of an isoolefin/para-alkylstyrene copolymer, said isoolefin having between 4 and 7 carbon atoms and said copolymer containing from about 0.5% to about 20% by weight para-alkylstyrene, and wherein from about 0.01 mole % to about 60 mole % of the alkyl groups present on the benzene ring of the para-alkylstyrene contain a halogen atom.

2. The composition of claim 1, wherein the rubber component is selected from the group consisting of butyl rubber, halogenated butyl rubber, isobutylene homopolymers, neoprene, nitrile rubbers, ethylene/propylene/diene terpolymers, ethylene/propylene copolymers, styrene butadiene rubbers, polybutadiene, polyisoprene, isoolefin/para-alkylstyrene copolymers, halogenated isoolefin/para-alkylstyrene copolymers, and natural rubbers.

3. The composition of claim 1, wherein the rubber component is halogenated butyl rubber.

4. The composition of claim 1, wherein the rubber component is a halogenated isoolefin/para-alkylstyrene copolymer.

5. The composition of claim 3, wherein the halogenated butyl rubber contains from about 85% to about 99.5% by weight repeat units derived from isobutylene, from about 0.1 to about 15% by weight repeat units derived from conjugated diene and from about 0.1% to about 15% by weight halogen.

6. The composition of claim 3, wherein the halogenated butyl rubber contains from about 85% to about 99.5% by weight repeat units derived from isobutylene, from about 0.1 to about 15% by weight repeat units derived from isoprene and from about 0.1% to about 15% by weight bromine.

7. The composition of claim 4, wherein the copolymer contains isobutylene from about 88% to about 98% by weight copolymer.

8. The composition of claim 1, wherein the blend contains from about 0.05 to about 2 mole equivalents of amine relative to the number of moles of halogen present in the blend.

9. The composition of claim 1, wherein $R^3$ is a $C_1$ to $C_8$ hydrocarbyl group.

10. The composition of claim 1, wherein both $R^1$ and $R^2$ are hydrogen.

11. The composition of claim 1, wherein both $R^1$ and $R^2$ are $C_4$ to $C_{30}$ hydrocarbyl groups.

12. The composition of claim 1, wherein $R^1$ is a $C_4$ to $C_{30}$ hydrocarbyl group and $R^2$ is a $C_1$ to $C_4$ hydrocarbyl group.

13. The composition of claim 1, wherein $R^1$ is a $C_4$ to $C_{30}$ hydrocarbyl group, $R^2$ is a $C_1$ to $C_4$ hydrocarbyl group and $R^3$ is a $C_1$ to $C_8$ hydrocarbyl group.

14. The composition of claim 1, wherein the amine compound is selected from the group consisting of N,N-dimethyl hexadecylamine, N,N dimethyl hexylamine, N,N-dimethyl dodecylamine, N,N-dimethyl octadecylamine and N,N-diethyl decylamine, N,N-dimethylbenzylamine, N,N-methyl propyl hexadecylamine, and morpholine.

15. The composition of claim 1, wherein the amine compound is N,N-dimethyl hexadecylamine.

16. The composition of claim 1, wherein the amine is present from about 0.01 to about 5 weight % of the blend.

17. The composition of claim 1, wherein the blend is cured.

18. A method of forming a blended composition comprising combining:
from about 5% to about 95% by weight of a rubber component;
an amine compound represented by the formula $(R^1R^2R^3)N$, wherein $R^1$ is either hydrogen or a $C_4$ to $C_{30}$ hydrocarbyl group, $R^2$ is either hydrogen or a $C_1$ to $C_{30}$ hydrocarbyl group; and $R^3$ is either hydrogen or a $C_1$ to $C_{30}$ hydrocarbyl group, provided that at least one of $R^1$, $R^2$ and $R^3$ is not hydrogen; and
from about 95% to about 5% by weight of a component A, wherein said component A consists essentially of an isoolefin/para-alkylstyrene copolymer, said isoolefin having between 4 and 7 carbon atoms and said copolymer containing from about 0.5% to about 20% by weight para-alkylstyrene, and wherein from about 0.01 mole % to about 60 mole % of the alkyl groups present on the benzene ring of the para-alkylstyrene contain a halogen atom.

19. The method of claim 18, wherein the rubber component is selected from the group consisting of butyl rubber, halogenated butyl rubber, isobutylene homopolymers, neoprene, nitrile rubbers, ethylene/propylene/diene terpolymers, ethylene/propylene copolymers, styrene butadiene rubbers, polybutadiene, polyisoprene, isoolefin/para-alkylstyrene copolymers, halogenated isoolefin/para-alkylstyrene copolymers, and natural rubbers.

20. The method of claim 18, wherein the rubber component is halogenated butyl rubber.

21. The method of claim 18, wherein the rubber component is a halogenated isoolefin/para-alkylstyrene copolymer.

22. The method of claim 20, wherein the halogenated butyl rubber contains from about 85% to about 99.5% by weight repeat units derived from isobutylene, from about 0.1 to about 15% by weight repeat units derived from conjugated diene and from about 0.1% to about 15% by weight halogen.

23. The method of claim 22, wherein the halogenated butyl rubber contains from about 85% to about 99.5% by weight repeat units derived from isobutylene, from about 0.1 to about 15% by weight repeat units derived from isoprene and from about 0.1% to about 15% by weight bromine.

24. The method of claim 21, wherein the copolymer contains isobutylene from about 88% to about 98% by weight copolymer.

25. The method of claim 18, wherein the blend contains from about 0.05 to about 2 mole equivalents of amine relative to the number of moles of halogen present in the blend.

26. The method of claim 18, wherein $R^3$ is a $C_1$ to $C_8$ hydrocarbyl group.

27. The method of claim 18, wherein both $R^1$ and $R^2$ are hydrogen.

28. The method of claim 18, wherein both $R^1$ and $R^2$ are $C_4$ to $C_{30}$ hydrocarbyl groups.

29. The method of claim 18, wherein $R^1$ is a $C_4$ to $C_{30}$ hydrocarbyl group and $R^2$ is a $C_1$ to $C_4$ hydrocarbyl group.

30. The method of claim 18, wherein $R^1$ is a $C_4$ to $C_{30}$ hydrocarbyl group, $R^2$ is a $C_1$ to $C_4$ hydrocarbyl group and $R^3$ is a $C_1$ to $C_8$ hydrocarbyl group.

31. The method of claim 18, wherein the amine compound is selected from the group consisting of N,N-dimethyl hexadecylamine, N,N-dimethyl hexylamine, N,N-dimethyl dodecylamine, N,N-dimethyl octadecylamine and N,N-diethyl decylamine, N,N-dimethylbenzylamine, N,N-methyl propyl hexadecylamine, and morpholine.

32. The method of claim 18, wherein the amine compound is N,N-dimethyl hexadecylamine.

33. The method of claim 18, wherein the amine compound is present from about 0.01 to about 5 weight % of the blend.

34. The method of claim 18, wherein the blended composition is cured.

35. The composition of claim 1, wherein the para-alkylstyrene is para-methylstyrene.

36. The method of claim 18, wherein the para-alkylstyrene is para-methylstyrene.

* * * * *